(12) United States Patent
Konuma (10) Patent No.: US 7,448,774 B2
(45) Date of Patent: Nov. 11, 2008

(54) ILLUMINATION OPTICAL SYSTEM, ILLUMINATION UNIT AND IMAGE PROJECTION APPARATUS EMPLOYING THE SAME

(75) Inventor: Osamu Konuma, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/595,918

(22) Filed: Nov. 13, 2006

(65) Prior Publication Data

US 2007/0153521 A1    Jul. 5, 2007

(30) Foreign Application Priority Data

Dec. 20, 2005  (JP)  ............................. 2005-365824
Aug. 17, 2006  (KR)  ...................... 10-2006-0077779

(51) Int. Cl.
*F21V 7/00*  (2006.01)
*F21V 5/00*  (2006.01)
*F21S 8/00*  (2006.01)
*G02B 17/00*  (2006.01)

(52) U.S. Cl. ...................... 362/309; 362/268; 362/328; 359/728

(58) Field of Classification Search ................ 362/242, 362/243, 244, 245, 308, 309, 328, 335, 326, 362/311, 235, 297, 307, 327, 341, 202, 208, 362/455, 347, 350, 259, 268; 359/409, 708, 359/718, 642, 726, 727, 728; 352/198; 349/5
See application file for complete search history.

(56) References Cited

U.S. PATENT DOCUMENTS

| | | | | |
|---|---|---|---|---|
| 1,740,609 A * | 12/1929 | Lee | .............................. | 362/335 |
| 3,708,221 A * | 1/1973 | Schaefer | ..................... | 359/718 |
| 4,384,271 A * | 5/1983 | Visser | ......................... | 362/296 |
| 4,776,681 A * | 10/1988 | Moskovich | .................. | 359/649 |
| 6,036,343 A * | 3/2000 | Tomioka et al. | ............. | 362/574 |
| 6,188,529 B1 * | 2/2001 | Koyama et al. | ............. | 359/738 |
| 6,254,264 B1 * | 7/2001 | Koshikawa et al. | ......... | 362/558 |
| 6,523,977 B2 * | 2/2003 | Chuang et al. | .............. | 362/231 |
| 6,575,580 B2 * | 6/2003 | Okamori et al. | ............... | 353/98 |
| 6,761,464 B2 * | 7/2004 | Hsien | .......................... | 362/158 |
| 6,767,112 B2 * | 7/2004 | Wu | ............................. | 362/247 |

(Continued)

FOREIGN PATENT DOCUMENTS

JP    07-174974    7/1995

(Continued)

*Primary Examiner*—Hargobind S. Sawhney
*Assistant Examiner*—David R Crowe
(74) *Attorney, Agent, or Firm*—Roylance, Abrams, Berdo & Goodman, L.L.P.

(57) ABSTRACT

An illumination optical system, an illumination unit, and an image projection apparatus employing the same are provided. The illumination optical system includes a light source irradiating a diverging light, a reflection optical system condensing the diverging light from the light source, and a lens optical system projecting the light condensed by the reflection optical system. The reflection optical system is comprised of an aspherical concave mirror. The lens optical system comprises a condensing lens having a positive refractive power in a central part and a refractive power of the condensing lens being decreased toward a circumferential part. Optical efficiency may be improved even when a light-emitting surface of the light source is relatively large and the light source cannot be regarded as a point light source.

21 Claims, 6 Drawing Sheets

U.S. PATENT DOCUMENTS

| | | | |
|---|---|---|---|
| 6,900,953 B2 * | 5/2005 | Okumura | 359/819 |
| 7,059,731 B2 * | 6/2006 | Lee et al. | 353/99 |
| 7,097,334 B2 * | 8/2006 | Ishida et al. | 362/516 |
| 2002/0114157 A1 * | 8/2002 | Chuang et al. | 362/231 |
| 2003/0193605 A1 * | 10/2003 | Yamaguchi | 348/335 |
| 2004/0042085 A1 * | 3/2004 | Hough | 359/619 |
| 2004/0057099 A1 * | 3/2004 | Kim | 359/216 |
| 2005/0140831 A1 * | 6/2005 | Yoon et al. | 348/744 |
| 2006/0023449 A1 * | 2/2006 | Lee et al. | 362/231 |

FOREIGN PATENT DOCUMENTS

| | | |
|---|---|---|
| JP | 10-311944 | 11/1998 |
| JP | 2003-35883 | 2/2003 |
| JP | 2005-208571 | 8/2005 |

* cited by examiner

ILLUMINATION OPTICAL SYSTEM, ILLUMINATION UNIT AND IMAGE PROJECTION APPARATUS EMPLOYING THE SAME

CROSS-REFERENCE TO RELATED PATENT APPLICATIONS

This application claims the benefit under 35 U.S.C. § 119(a) of Japanese Patent Application No. 10-2005-365824, filed on Dec. 20, 2005, in the Japanese Intellectual Property Office, and of Korean Patent Application No. 10-2006-0077779, filed on Aug. 17, 2006 in the Korean Intellectual Property Office, the entire disclosures of both of which are hereby incorporated by reference.

BACKGROUND OF THE INVENTION

1. Field of the Invention

The present invention relates to an illumination optical system, an illumination unit, and an image projection apparatus employing the same. More particularly, the present invention relates to an illumination optical system having an improved structure in which light may be effectively condensed even when a light source cannot be regarded as a point light source, an illumination unit, and an image projection apparatus employing the same.

2. Description of the Related Art

Conventionally, various illumination optical systems that condense light emitted from a light source and illuminate a proper region with a desired light distribution have been proposed. Recently, solid light-emitting devices, such as light emitting diodes (LED's), have been widely used as light sources. Additionally, such illumination optical systems have been used as a portion of image projection apparatuses, such as projectors, rear projection televisions, and light-transmitting apparatuses.

For example, a light-emitting apparatus is disclosed in Japanese Patent Laid-open Publication No. hei 10-311944 (hereinafter, referred to as patent literature 1). In FIG. 1, 5 or 9, the light-emitting apparatus includes a reflector whose cross-section is an oval, partial circular arc-shaped reflective surface, a lamp that emits light onto a focus of the reflective surface, and a concave lens disposed between two focuses of the reflector.

Additionally, Japanese Patent Laid-open Publication No. 2003-35883 (hereinafter, referred to as patent literature 2) discloses an optical output device. In FIGS. 5 and 7, the optical output device includes a point light source, a reflector that forms a horned reflective surface on its rear surface, a first lens group having a positive refractive power and disposed on front surfaces of the point light source and the reflector, respectively, and a second lens group disposed in the vicinity of an optical axis of the first lens group, wherein the second lens group has a refractive power that is negative or 0 in the vicinity of the optical axis and its circumferential refractive power is positive.

Additionally, Japanese Patent Laid-open Publication No. 2005-208571 (hereinafter, referred to as patent literature 3) discloses an illumination apparatus and a projector. In FIG. 1, 8 or 10, the illumination apparatus includes a light emitting diode (LED) element and a collimator optical system, wherein the collimator optical system includes a meniscus lens whose light source surface is a concave surface, and an aspherical lens having an aspherical surface, sequentially from the LED element. A condenser optical system having a decreasing refractive power farther from the optical axis, is disposed on a rear end of the optical system. Light emitted from a circumference of the light source can be approximately condensed in the range of condensing light emitted from the central part of the light source.

An illumination optical system using a solid light-emitting element, such as an LED, an illumination unit, and an image projection apparatus using the same needs to be made small and to have high brightness. To implement high brightness, the light-emitting area of a light source, such as an LED, is increased or a plurality of light sources are disposed so that the optical output of a light source can be increased. In the illumination optical system, preferably, light emitted from the light source can be guided with high efficiency in a direction toward a predetermined angle.

However, the above-described illumination optical system, the illumination unit using the same, and the image projection apparatus have the following problems.

In the technique disclosed in the patent literature 1, the light source is disposed in a focus position of the oval-shaped reflector so that its position can be adjusted. Thus, a desired light distribution can be obtained when a lamp is a point light source but if the size of the lamp is relatively increased compared to the lens or the reflector, the entire light emitted from all light-emitting surfaces of a so-called surface light source cannot be guided to a direction toward a predetermined angle, and because good light distribution cannot be consequently obtained, optical efficiency is deteriorated.

The technique disclosed in the patent literature 2 has a different construction from that of the patent literature 1 but there is a common point that a light distribution is adjusted based on a point light source. Thus, when the size of the light source is relatively large, good light distribution cannot be obtained and optical efficiency is deteriorated.

Because the invention disclosed in the patent literature 3 uses a lens optical system as a collimator optical system, even though light emitted from the circumference of the light can be condensed, the light is defined as the range of a numerical aperture (NA) of the lens optical system. Thus, to improve optical efficiency, a collimator optical system having a large NA needs to be constructed. However, because the construction of a lens is complicated or the diameter of an effective lens is increased, the illumination optical system having a small size and good optical efficiency, the illumination unit, and the image projection apparatus employing the same cannot be implemented.

Accordingly, a need exists for an illumination optical system in which light may be effectively condensed regardless of the light source.

SUMMARY OF THE INVENTION

The present invention provides an illumination optical system that is small and in which optical efficiency may be improved even when a light-emitting surface of a light source is relatively large and a light source cannot be regarded as a point light source, and an illumination unit and an image projection apparatus employing the same.

According to an aspect of exemplary embodiments of the present invention, an illumination optical system comprises a light source irradiating a diverging light, a reflection optical system condensing the diverging light from the light source, and a lens optical system projecting the light condensed by the reflection optical system. The reflection optical system is comprised of an aspherical concave mirror. The lens optical system comprises a condensing lens having a positive refractive power in a central part and a refractive power of the condensing lens decreases toward a circumferential part.

According to exemplary embodiments of the present invention, the diverging light from the light source is condensed by the reflection optical system formed of an aspherical concave mirror and is also condensed by the lens optical system, and thus may be condensed in the range of a predetermined projection angle.

The concave mirror for condensing the diverging light from the light source may reflect all diverging light in all directions without being limited by a numerical aperture (NA) as in a collimator optical system.

Additionally, the concave mirror is formed of an aspherical surface such that the concave mirror acts as an aspherical surface of the lens optical system and simultaneously, the emission angle of all on-axis light and off-axis light may be effectively suppressed in a predetermined range. Diverging light from the circumference of the light source (hereinafter, referred to as 'off-axis light') greatly deviates from a reflection direction of a diverging light from the center of the light source (hereinafter, referred to as 'on-axis light') as the off-axis light is reflected from a reflective surface in the central part that is closer to the optical axis of the concave mirror of the entire light beam. However, because the lens optical system has a larger positive refractive power in the central part than in the circumferential part, large refraction acts on the off-axis light passing the central part of the lens optical system. Thus, the off-axis light that deviates from the reflection direction of the on-axis light is refracted by the reflection optical system so that a difference between the off-axis light and the reflection direction of the on-axis light may be reduced. Thus, the emission angle from the lens optical system of the off-axis light may be suppressed in a predetermined range.

Additionally, the illumination unit of exemplary embodiments of the present invention may include a plurality of illumination optical systems of exemplary embodiments of the present invention.

Accordingly, because the illumination unit of exemplary embodiments of the present invention employs the illumination optical system of exemplary embodiments of the present invention, the same effects as those of the illumination optical system of exemplary embodiments of the present invention are obtained.

Additionally, the image projection apparatus of exemplary embodiments of the present invention employs the illumination optical system or the illumination unit of exemplary embodiments of the present invention as a projection light source.

Accordingly, the image projection apparatus of exemplary embodiments of the present invention employs the illumination optical system or the illumination unit of exemplary embodiments of the present invention, the same effects as those of the illumination optical system or the illumination unit of exemplary embodiments of the present invention are obtained.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention are described in detail with reference to the attached drawings. A common description of corresponding elements is omitted.

First Exemplary Embodiment

An illumination optical system according to an exemplary embodiment of the present invention is described together with an illumination unit and an image projection apparatus employing the same.

Figure 1:
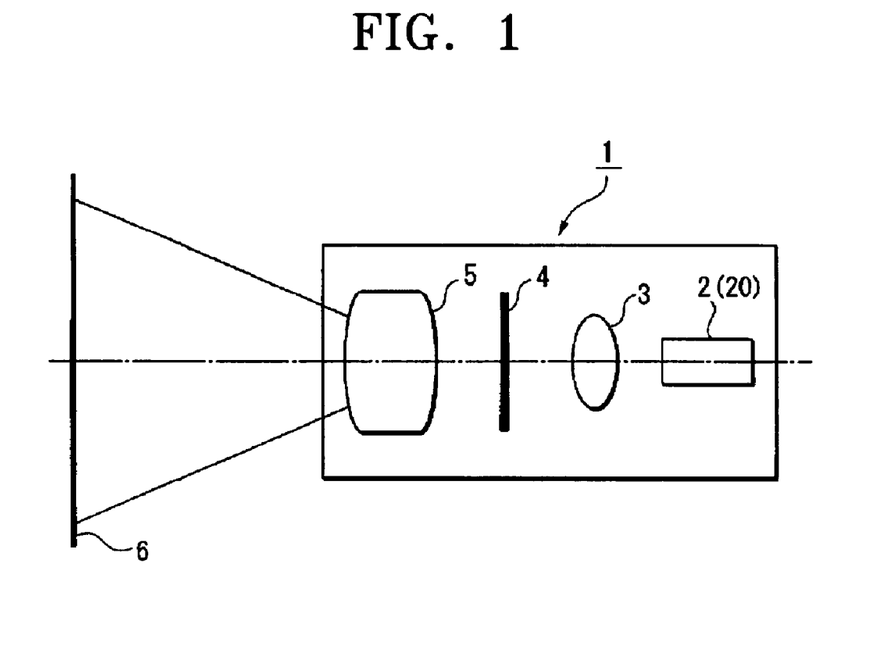
FIG. 1 is a schematic view of an image projection apparatus using an illumination optical system according to an exemplary embodiment of the present invention.

FIG. 1 is a schematic view of an image projection apparatus using an illumination optical system according to an exemplary embodiment of the present invention.

Figure 2A:
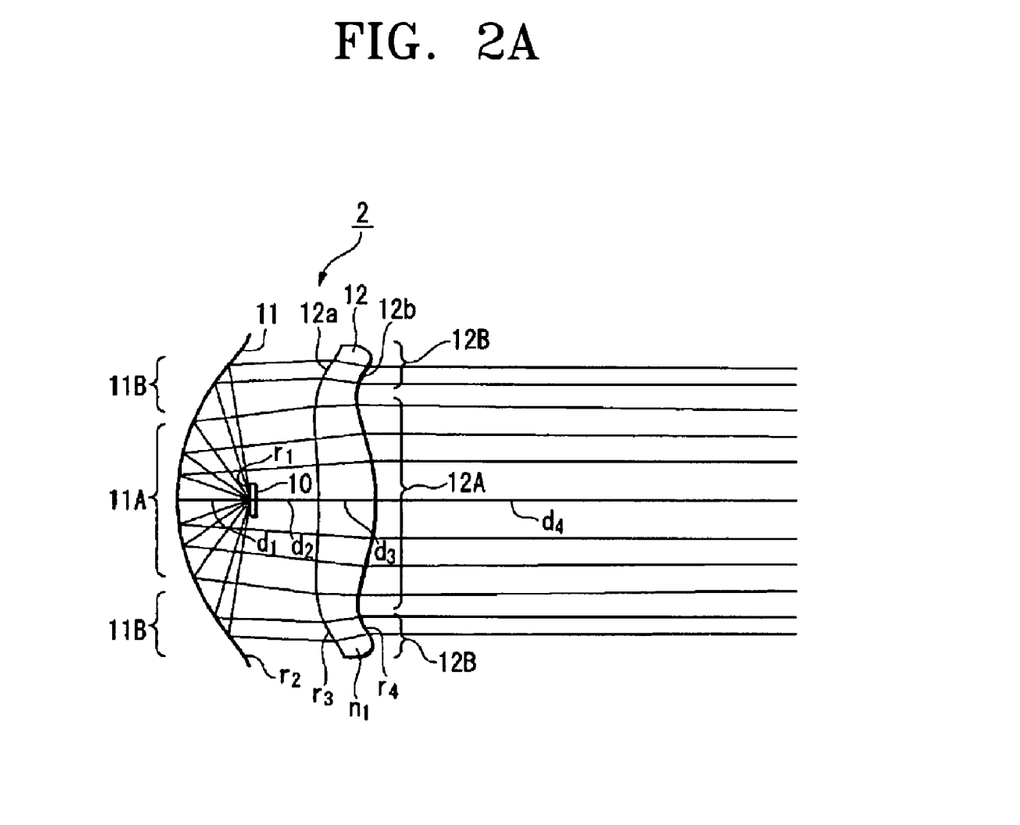
FIGS. 2A and 2B respectively illustrate light beams showing a schematic construction of the illumination optical system illustrated in FIG. 1.
Figure 2B:
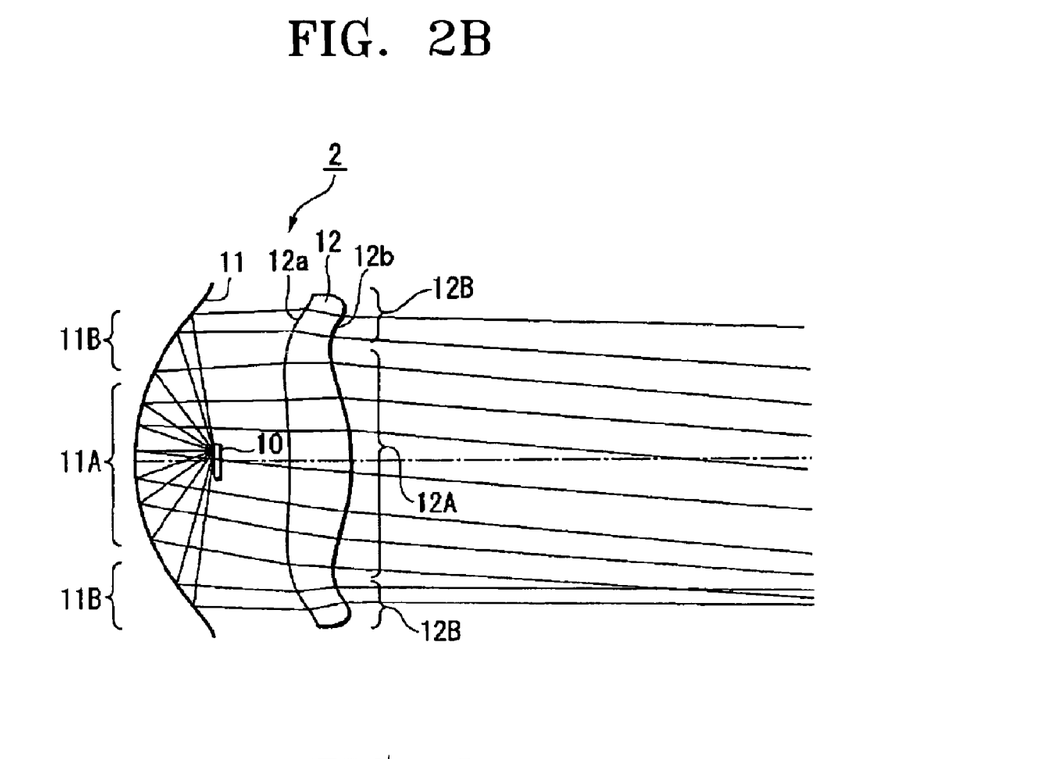
Figure 3:
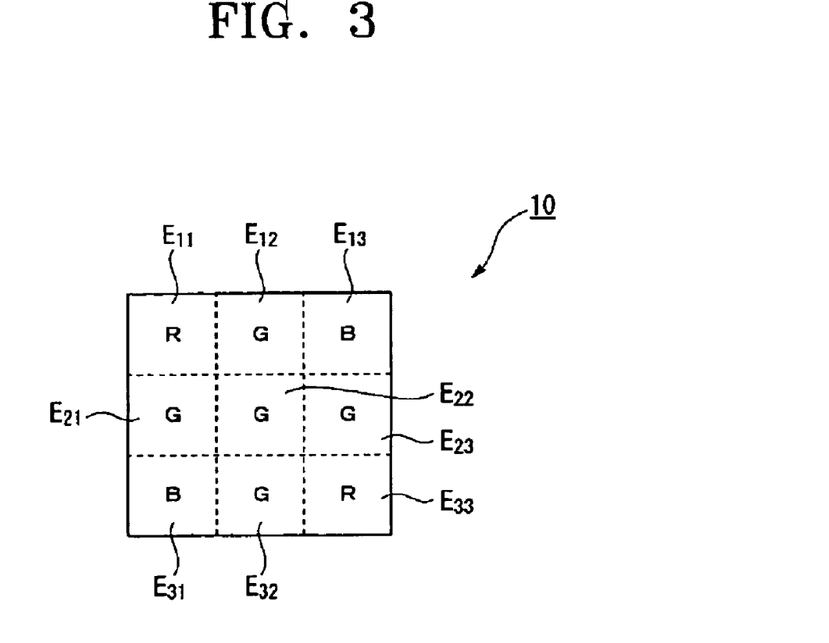
FIG. 3 is a plan view illustrating an example of a light source used in the illumination optical system illustrated in FIG. 1.

FIG. 2A illustrates light beams showing a schematic construction of the illumination optical system illustrated in FIG. 1 from a cross-section including an optical axis representing an optical path of on-axis light. FIG. 2B illustrates light beams from a cross-section including an optical axis representing an optical path of off-axis light of the illumination optical system illustrated in FIG. 1. FIG. 3 is a plan view illustrating an example of a light source used in the illumination optical system illustrated in FIG. 1.

A projector 1 is an image projection apparatus, which includes an illumination unit 2, having the illumination optical system illustrated in FIG. 2 and that projects a color image in response to an external signal, for example, onto a reflection type screen 6.

The schematic construction of the projector 1 includes an illumination unit 2, a condensing lens 3, a space modulation element 4, and a projection lens 5.

The illumination unit 2 sequentially generates substantially parallel light of a wavelength corresponding to at least red, green, and blue, which are three primary colors of light, to display a full-color image with a time-divided timing.

The condensing lens 3 is an optical element that condenses the substantially parallel light generated by the illumination unit 2 in a modulation region on the space modulation element 4.

The space modulation element 4 space-modulates light condensed by the condensing lens 3 in response to an image signal of a wavelength light corresponding to an irradiation timing and displays a color-decomposed image. A liquid crystal display (LCD) as a transmission type device, a digital micromirror device (DMD), which is a micromirror array, or liquid crystal on silicon (LCOS) as a reflection type device may be used as the space modulation element 4.

The projection lens 5 is an optical element that enlarges and projects an image displayed on the space modulation element 4 onto the reflection type screen 6.

The detailed construction of the illumination unit 2 will now be described.

As illustrated in FIG. 2A, the illumination unit 2 includes a light-emitting diode (LED) 10, a concave mirror 11, and a condensing lens 12, which constitutes the illumination optical system illustrated in FIG. 1, and these elements are disposed in a case (not shown) to form the illumination unit 2.

The LED 10 is a light source that independently drives monochrome LED chips R, G, and B and forms an illumination light of white.

In an exemplary embodiment, as illustrated in FIG. 3, monochrome LED chips R, G, and B corresponding to respective colors of red, green, and blue, are arranged in a 3×3 square matrix shape. Although not shown, a voltage-applying unit for light-emitting is provided on the monochrome LED chips R, G, and B and may be lit and controlled by a proper lighting controlling unit.

With respect to the position of arrangement of the respective monochrome LED chips R, G, and B, when a latitudinal direction of a light-emitting surface of the LED 10 is represented as a subscript i and a longitudinal direction thereof is represented as a subscript j and the position of arrangement of the respective monochrome LED chips R, G, and B is represented as $E_{ij}$ (where, i and j is one of integers 1, 2, and 3), the red LED chips R are disposed in positions $E_{11}$ and $E_{33}$, the blue LED chips B are disposed in positions $E_{13}$ and $E_{31}$ and the green LED chips G are disposed on positions other than the positions $E_{11}$, $E_{33}$, $E_{13}$ and $E_{31}$. In the arrangement positions, respective monochrome LED chips R, G, B, G, R, G, B, and G are disposed in positions $E_{11}$, $E_{12}$, $E_{13}$, $E_{23}$, $E_{33}$, $E_{32}$, $E_{31}$, $E_{21}$ that constitute the outer circumference of the LED 10 so that respective colors are circulated and balance among adjacent monochrome LED chips is improved. Additionally, because the arrangement of respective colors is bilaterally symmetrical or rotationally symmetrical with a middle position $E_{22}$, balance is also made two-dimensionally. For this reason, the arrangement position of the respective monochrome LED chips R, G, and B is the arrangement in which, even when a variation occurs in an optical path of light irradiated onto the center and the circumference of the LED 10, the balance of R, G, and B is not easily broken on an irradiated surface.

The concave mirror 11 is a reflective optical element that condenses light emitted from the LED 10, and includes a concave reflective surface formed of a rotational symmetrical aspherical surface that is close to a rotational parabolic surface. In an exemplary embodiment, the concave reflective surface has a refractive power that increases as it is closer to the circumference from the middle portion in a diameter direction.

The concave mirror 11 is disposed by a distance from the LED 10 such that a normal passing the center of the light-emitting surface of the LED 10 coincides with the optical axis of the concave mirror 11.

For example, as in an exemplary embodiment, to emit the substantially parallel light from the illumination unit 2, the concave mirror 11 is disposed at a distance in which on-axis light reflected from the circumference in the diameter direction of the concave mirror 11 is substantially parallel light.

The condensing lens 12 is an aspherical lens of rotational symmetry that has a positive refractive power in the center in the diameter direction and in which the refractive power is decreased toward the circumference in the diameter direction. It is assumed that an object side (a side of the concave mirror 11) surface is a first surface 12a and an image side surface is a second surface 12b. In an exemplary embodiment, as illustrated in FIG. 2A, the first surface 12a is formed as a concave surface in the central part 12A and as a convex surface in the circumferential part 12B, and the second surface 12b is formed as a convex surface whose curvature is entirely smaller than that of the first surface 12a in the central part 12A and as a concave surface having approximately the shape of the first surface 12a in the circumferential part 12B so that the above-described refractive power distribution is achieved on the condensing lens 12. That is, the refractive power of the condensing lens 12 is decreased along the diameter direction while taking a positive value within the central part 12A and is approximately 0 in the circumferential part 12B. The central part 12A and the circumferential part 12B are relative classifications for explanatory conveniences and have different ranges in the first surface 12a and the second surface 12b, respectively.

Figure 4:
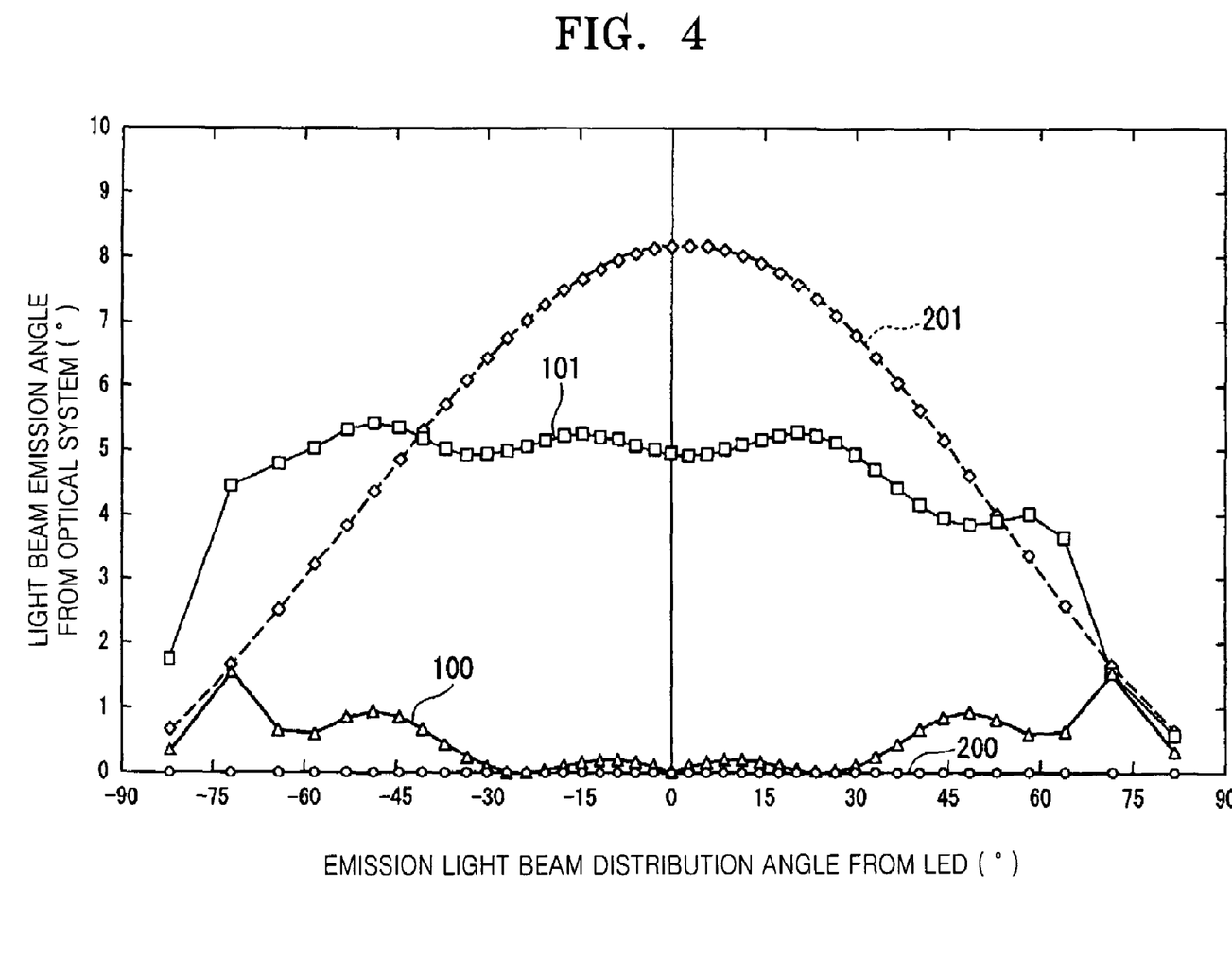
FIG. 4 is a graph illustrating an example of a light beam emission angle distribution from the illumination optical system including on-axis light and off-axis light in the illumination optical system illustrated in FIG. 1.

The operation of the projector 1 will now be described based on the action of the illumination optical system illustrated in FIG. 1. FIG. 4 is a graph illustrating an example of a light beam emission angle distribution from the illumination optical system including on-axis light and off-axis light in the illumination optical system illustrated in FIG. 1. The latitudinal axis represents an emission light beam distribution angle from the LED, and the longitudinal axis represents a light beam emission angle from the illumination optical system, and each unit is in degrees (°). Each angle represents an angle of the light beam based on an angle of the light beam that is parallel to the optical axis of the optical system is 0°.

When image signals color-decomposed into R, G, and B are applied to the projector 1 from the outside, the projector 1 converts and lights the illumination unit 2 in the order of R, G, and B, for example, and time-dividing drives the space modulation element 4 in response to the image signals according to respective colors. Lights of R, G, and B emitted from the illumination unit 2 are condensed by the condensing lens 3, are space-modulated by the space modulation element 4 and are displayed as color decomposition images corresponding to respective colors. The images displayed on the space modulation element 4 are enlarged by the projection lens 5 and are projected onto the reflective type screen 6. As a result, a full-color image is observed on the reflective type screen 6.

When a lighting control signal is transmitted to the illumination unit 2, the monochrome LED chips R, G, and B corresponding to predetermined colors of the LED 10 are lit.

Generally, the LED 10 approximately satisfies Lambert's law and thus has a light distribution approximately proportional to the cosine of a light distribution angle. That is, light emitted from the LED 10 becomes a diverging light having a light distribution whose optical output is decreased as a light distribution angle θ measured on the optical axis is changed from 0° to 90°.

In an exemplary embodiment, for example, the light-emitting area of the LED 10 is 0.5 mm$^2$. For this reason, the LED 10 cannot be regarded as a point light source and it cannot be ignored that light from the circumference is condensed as off-axis light and a different light distribution from on-axis light is formed.

Because the refractive power of the concave mirror 11 is decreased from the center to the circumference and the on-axis light becomes substantially parallel light in the circumference, the on-axis light of the LED 10 emitted from the LED 10 is condensed as light slightly emitted from the center 11A and is condensed as substantially parallel light in the circumference 11B, as illustrated in FIG. 2A.

Because a difference between the off-axis light and the on-axis light is increased as the emission angle from the LED 10 of light beams is smaller, as illustrated in FIG. 2B, a light beam reflection angle from the concave mirror 11 is increased. Thus, a relatively high output light irradiated on the center 11A is reflected in a direction inclined to the optical axis.

Because the refractive power of light in the center 11A is smaller than that of light on the parabolic reflective surface, the light in the center 11A is condensed as light slightly emitted at an angle with respect to the optical axis.

The light in the circumference 11B is condensed as substantially parallel light like the on-axis light.

Condensed light beams of the on-axis light and the off-axis light using the aspherical concave mirror 11 are suitable for controlling an emission light beam angle together with an aspherical action of the condensing lens 12 that is described later.

The light reflected from the concave mirror 11 is condensed by the condensing lens 12.

The on-axis light, which becomes light slightly emitted by reflection of the concave mirror 11 and is incident on the central part 12A, is condensed by a positive refractive power of the central part 12A and becomes substantially parallel light. Similarly, the on-axis light that becomes substantially parallel light and is incident on the circumferential part 12B, transmits the circumferential part 12B having a refractive power of approximately 0 and is emitted as substantially parallel light.

The off-axis light, which becomes light slightly emitted at a predetermined angle with respect to the optical axis by reflection of the concave mirror 11 and is incident on the central part 12A, is condensed by a refraction action using a positive refractive power of the central part 12A and becomes substantially parallel light having a light beam emission angle distribution defined with respect to the optical axis, as illustrated in FIG. 2B. Additionally, similarly, the off-axis light, which becomes substantially parallel light and is incident on the circumferential part 12B, transmits the circumferential part 12B having a refractive power of approximately 0 and is emitted as substantially parallel light.

Thus, light emitted from the condensing lens 12 may be irradiated in the range determined according to an emission angle with respect to the optical axis and a distance to an illumination position.

The illumination optical system according to an exemplary embodiment may have the light-emitting area of the LED 10 being approximately 0.5 mm$^2$ and the effective diameter of the concave mirror 11 is approximately 9.5 mm and the effective diameter of the condensing lens 12 may be approximately 9.8 mm. Parameters for constituting the illumination optical system may be the same as the following Tables 1 and 2, for example. Parameters $r_i$, $d_i$, and $n_i$ (where i is an integer) indicated in FIG. 2A correspond to $r_i$, $d_i$, and $n_i$, which are parameters for constituting the optical system shown in the following Tables 1 and 2. The unit of a length is mm. Additionally, a refraction index is a value based on a line d (wavelength: 587.56 nm).

An aspherical shape is obtained using equation 1, as the amount Z(h) of displacement in an optical axis direction when a vertex of a surface is an original point and h is the height from the optical axis.

$$Z(h) = \frac{h^2/r}{1+\sqrt{1-(1+k)(h/r)^2}} + Ah^4 + Bh^6 + Ch^8 + Dh, \quad (1)$$

where r is a curvature radius, k is a conic coefficient and A, B, C, and D are aspherical coefficients.

TABLE 1

| Surface | Curvature radius | Surface | Refraction | Abbe's |
|---------|------------------|---------|------------|--------|
| $r_1$ | ∞(light source) | $d_1 = -2.519$ | | |
| $r_2$ | aspherical [1] | $d_2 = 5.000$ | | |
| $r_3$ | aspherical [2] | $d_3 = 2.000$ | $n_1 = 1.5168$ | $v_1 = 64.2$ |
| $r_4$ | aspherical [3] | | | |

TABLE 2

| | Aspherical [1] | Aspherical [2] | Aspherical [3] |
|---|---|---|---|
| R | 6.320 | −14.141 | −5.648 |
| K | −1.000 | 0.000 | 0.000 |
| A | $0.258 \times 10^{-3}$ | $0.192 \times 10^{-2}$ | $0.552 \times 10^{-2}$ |
| B | $-0.385 \times 10^{-4}$ | $0.270 \times 10^{-4}$ | $-0.560 \times 10^{-3}$ |
| C | $0.358 \times 10^{-5}$ | $0.248 \times 10^{-5}$ | $0.455 \times 10^{-4}$ |
| D | $-0.840 \times 10^{-7}$ | $-0.102 \times 10^{-6}$ | $-0.987 \times 10^{-6}$ |

FIG. 4 is a graph illustrating a light beam emission angle distribution on the above-described conditions of the illumination optical system illustrated in FIG. 1.

Curve 100 illustrated in FIG. 4 represents a light beam emission angle distribution of on-axis light of the illumination optical system illustrated in FIG. 1 and curve 101 illustrated in FIG. 4 represents a light beam emission angle distribution of an off-axis light (phase height: 0.35 mm). Curves 200 and 201 are comparative examples in the case where a parabolic reflective surface instead of the illumination optical system illustrated in FIG. 1 is disposed.

For a parabolic reflective surface, the on-axis light becomes substantially parallel light when a light source is disposed in a focus position of the parabolic reflective surface. Thus, as indicated by curve 200, the light beam emission angle (hereinafter, referred to as an emission angle) becomes 0° regardless of an emission light beam distribution angle (hereinafter, referred to as a light distribution angle) from the LED 10. Additionally, the off-axis light is distributed in the range of about 8° according to a light distribution angle. Because a difference between the off-axis light reflected from the circumferential part of the parabolic reflective surface and the on-axis light is smaller as the light distribution angle is closer to 90°, the emission angle is approximately 0°.

Meanwhile, in the illumination optical system illustrated in FIG. 1, as indicated by curve 100, the on-axis light becomes substantially parallel light when the absolute value of the light distribution angle is in the range of ±30° and becomes substantially parallel light that slightly deviates from the parallel light when the absolute value of the light distribution angle is equal to or larger than ±30°.

Additionally, as indicated by curve 101, the emission angle of the off-axis light is decreased compared to the parabolic reflective surface when the light distribution angle is between about −41° and about +53°, and the emission angle of the off-axis light is suppressed to be equal to or less than about 5.4° in the entire range of the light distribution angle.

Furthermore, a distribution in which left and right is inversed may be obtained in off-axis light in a diagonal direction of 180°.

According to an exemplary embodiment, refractive powers of the central part and the circumferential part of each of the concave mirror 11 and the condensing lens 12 are changed so that deviation of the emission angle in the range where the light distribution angle is small may be reduced.

Meanwhile, in the range where the absolute value of the light distribution angle is large, an emission angle distribution is deteriorated compared to the case where both the on-axis light and the off-axis light are parabolic reflective surfaces but the optical output distribution of the LED 10 is concentrated in the range where the light distribution angle is small. Thus, optical efficiency as an illumination light may be securely improved and simultaneously, the entire light beam of the on-axis light and the off-axis light is in the range of a predetermined angle so that light may be effectively guided to a subsequent optical system.

Thus, according to the illumination optical system illustrated in FIG. 1, even when the relatively large LED 10, which cannot be regarded as a point light source, is used, good optical efficiency may be obtained and the illumination unit 2 or the projector 1 may be made small.

Additionally, because the LED 10 is comprised of the plurality of monochrome LED chips R, G, and B in an exemplary embodiment, the projector 1 may be constituted without using an optical system for synthesizing respective color lights. As a result, a compact apparatus may be constituted.

Additionally, because a two-dimensional arrangement balance of the monochrome LED chips R, G, and B is good, color deflection of the LED chips in the circumferential part of the LED 10, which becomes an off-axis component, is eliminated and the deterioration of a white balance may be prevented.

The illumination optical system illustrated in FIG. 1 has the construction in which the light source may be regarded as a surface light source having a finite size regarding the effective diameter of a reflection optical system. The diameter or the length of one side of the light-emitting surface of the light source may be smaller than the effective diameter of the reflection optical system. According to an exemplary embodiment of the present invention, because the surface light source having a finite size may be used even when a compact reflection optical system having a small effective diameter is used, a small light source that may be regarded as a point light source may be used. As a result, an illumination optical system that is compact and has a comparatively large light amount may be implemented.

Additionally, the illumination optical system illustrated in FIG. 1 is constituted in which a light source disposes a plurality of light-emitting elements. Wavelengths of the plurality of light-emitting elements are changed so that a compact illumination optical system including a plurality of wavelength lights, such as a white light, for example. Additionally, because the illumination optical system illustrated in FIG. 1 includes the plurality of light-emitting elements, a lighting timing is changed so that a light-emitting load of each of the light-emitting elements may be reduced and heat dissipation may be reduced.

The illumination optical system illustrated in FIG. 1 may properly deform an aspherical reflective surface of the concave mirror and two aspherical shapes of the condensing lens.

Figure 5A:
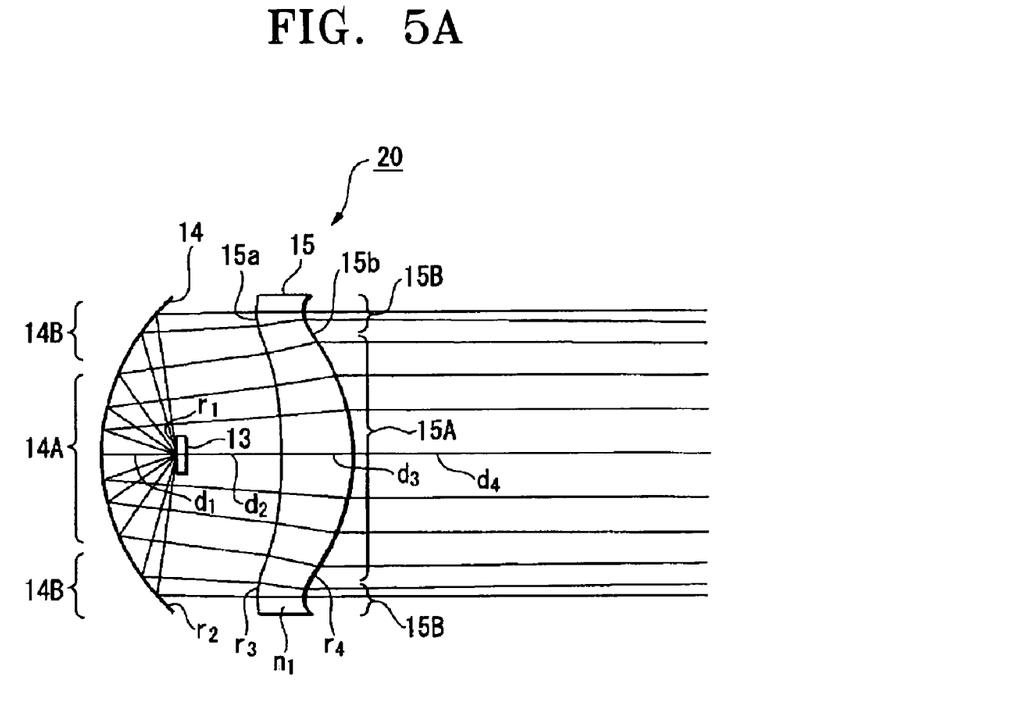
FIGS. 5A and 5B respectively illustrate light beams showing a schematic construction of the illumination optical system illustrated in FIG. 1.

FIG. 5A illustrates light beams showing a schematic construction of according to a modified example of the illumination optical system illustrated in FIG. 1 and a cross-section including an optical axis representing an optical path of on-axis light. Similarly, FIG. 5B illustrates light beams from a cross-section including an optical axis representing an optical path of off-axis light of the illumination optical system.

Figure 5B:
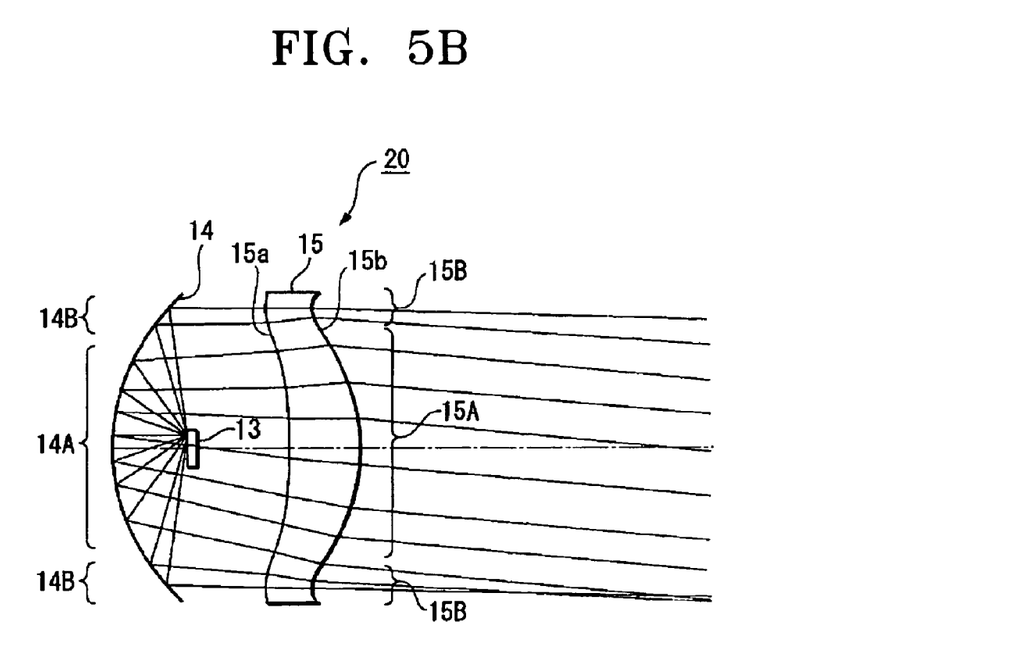

The illumination optical system of the modified example is comprised of an illumination unit 20, and the illumination unit 20 instead of the illumination unit 2 of the projector 1 illustrated in FIG. 1 may be used. Additionally, the illumination optical system of the modified example includes an LED 13, a concave mirror 14, and a condensing lens 15, instead of the LED 10, the concave mirror 11, and the condensing lens 12 illustrated in FIG. 1.

The illumination optical system of the modified example uses the LED 13 having a larger light-emitting surface than that of the LED 10 illustrated in FIG. 1, and aspherical conditions of the concave mirror 14 and the condensing lens 15 are set in the illumination optical system of the modified example.

Referring to FIG. 5A, in the current modified example, the light-emitting area of the LED 13 1.0 $mm^2$, the effective diameter of the concave mirror 14 is approximately 16.0 mm, and the effective diameter of the condensing lens 12 is approximately 16.0 mm.

The concave mirror 14 and the condensing lens 15 employ the aspherical shapes like the concave mirror 11 and the condensing lens 12. That is, as illustrated in FIG. 5A, central parts 14A and 15A, circumferential parts 14B and 15B, a first lens surface 15a, and a second lens surface 15b correspond to the central parts 11A and 12A, the circumferential parts 11B and 12B, the first lens surface 12a, and the second lens surface 12b, respectively, illustrated in FIG. 1. Only the ratio of the condensing lens 15 of the central part 15A to the circumferential part 15B becomes large.

The following Tables 3 and 4 show specific examples of parameters for constituting the illumination optical system of the modified example. Each symbol and unit are the same as those of the above-described Tables 1 and 2.

TABLE 3

| Surface | Curvature radius | Surface | Refraction | Abbe's |
|---|---|---|---|---|
| $r_1$ | ∞(light source) | $d_1$ = −4.211 | | |
| $r_2$ | aspherical [1] | $d_2$ = 10.000 | | |
| $r_3$ | aspherical [1] | $d_3$ = 4.000 | $n_1$ = 1.5168 | $v_1$ = 64.2 |
| $r_4$ | aspherical [3] | | | |

TABLE 4

| | Aspherical [1] | Aspherical [2] | Aspherical |
|---|---|---|---|
| R | 11.069 | −27.168 | −10.235 |
| K | −1.000 | 0.000 | 0.000 |
| A | $0.405 \times 10^{-4}$ | $-0.59 \times 10^{-3}$ | $0.146 \times 10^{-3}$ |
| B | $-0.777 \times 10^{-7}$ | $-0.150 \times 10^{-5}$ | $-0.624 \times 10^{-5}$ |
| C | $0.167 \times 10^{-7}$ | $0.878 \times 10^{-7}$ | $0.104 \times 10^{-6}$ |
| D | $-0.171 \times 10^{-9}$ | $-0.255 \times 10^{-9}$ | $-0.297 \times 10^{-9}$ |

According to this construction, the same effects as those of the above-described exemplary embodiment of FIG. 1 may be obtained.

Figure 6:
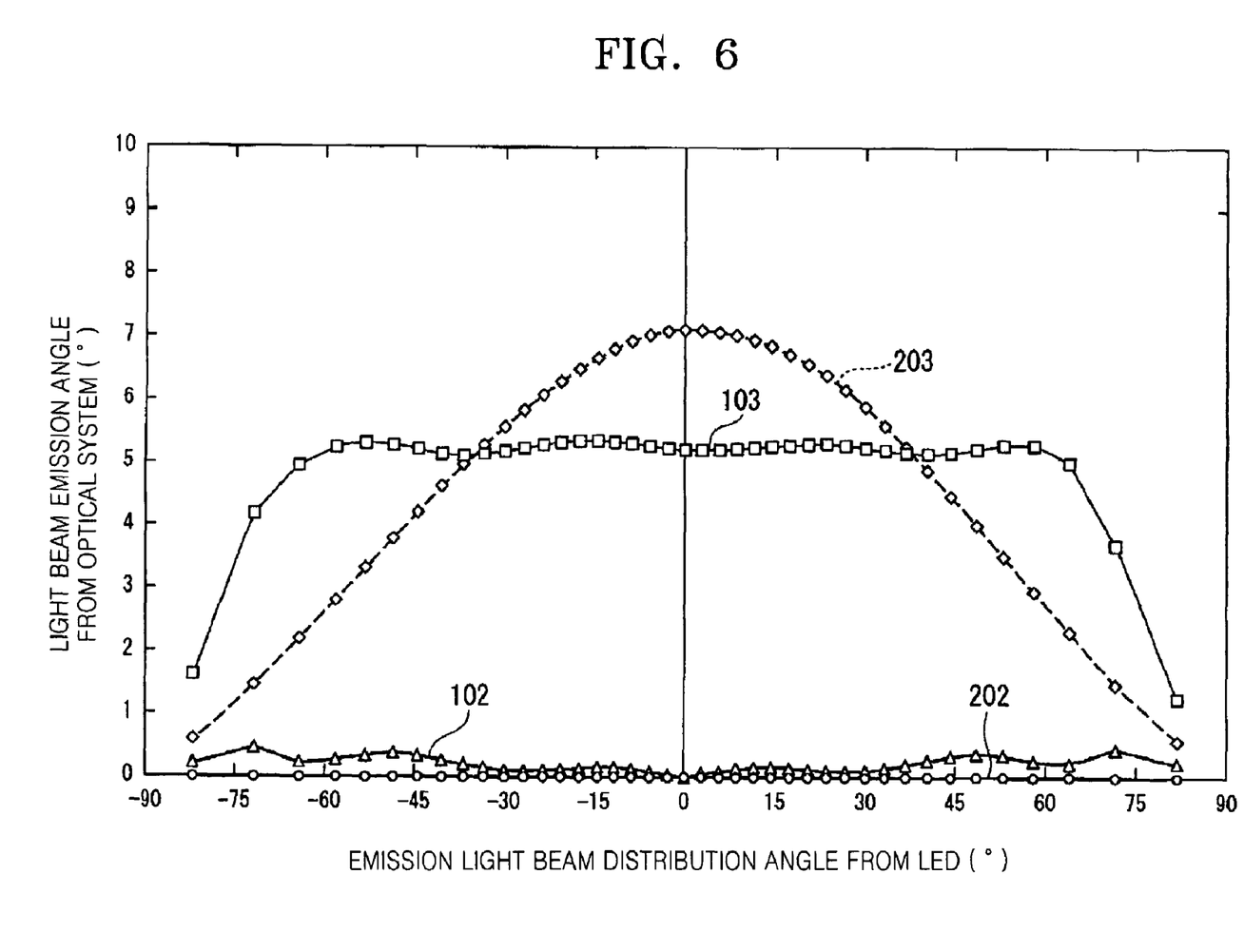
FIG. 6 is a graph illustrating an example of a light beam emission angle distribution from the illumination optical system including on-axis light and off-axis light in the illumination optical system illustrated in FIG. 5.

FIG. 6 is a graph illustrating an example of a light beam emission angle distribution from the illumination optical system including on-axis light and off-axis light in the illumination optical system illustrated in FIG. 5. Latitudinal axis represents an emission light beam distribution angle from an LED and longitudinal axis represents a light beam emission angle from the illumination optical system, and each unit is degrees (°).

Curvature 102 represents a light beam emission angle distribution of the on-axis light of the illumination optical system of the modified example, and curvature 103 represents a light beam emission angle distribution of the off-axis light (phase height: 0.70 mm). Curvatures 202 and 203 represent comparative examples of the case where a parabolic reflective surface instead of the illumination optical system of the modified example is disposed.

In the illumination optical system of the modified example, as indicated by curvature 102, the on-axis light becomes substantially parallel light when the light distribution angle is in the range of ±30° and becomes substantially parallel light that slightly deviates from the substantially parallel light when the absolute value of the light distribution angle is equal to or larger than ±30°. The emission angle of the on-axis light is equal to or less than about 0.5° in the entire range of the light distribution angle, unlike the case of FIG. 4. Thus, the on-axis light forms a better substantially parallel light.

Additionally, as indicated by curvature 103, the emission angle of the off-axis light is decreased compared to the parabolic reflective surface when the light distribution angle is between about −37° and about +37°, and the emission angle of the on-axis light is suppressed to be equal to or less than about 5.4° in the entire range of the light distribution angle. Additionally, the distribution symmetry of the off-axis light is good compared to the case of FIG. 4.

According to the current modified example, the size of one side of the LED 13 is twice the size of one side of the LED 10 and the area of the LED 13 is four times the area of the LED 10. The effective diameters of the concave mirror 14 and the condensing lens 15 are 1.68 times and 1.63 times, respectively. Thus, the off-axis light may be effectively condensed by a more compact construction.

Thus, for example, when light is projected from an LED chip having a light-emitting area of 1 mm$^2$ due to the necessity of light amount, four LED chips need to be disposed in the illumination unit 2 illustrated in FIG. 1 but only one LED chip is needed in the illumination unit 20 of the modified example. As such, the illumination unit and the image projection apparatus employing the same may be more compactly constructed.

Additionally, because LED chips may be disposed in a wider range, the number of arrangement of LED chips may be increased, which is preferable.

Second Exemplary Embodiment

Figure 7:
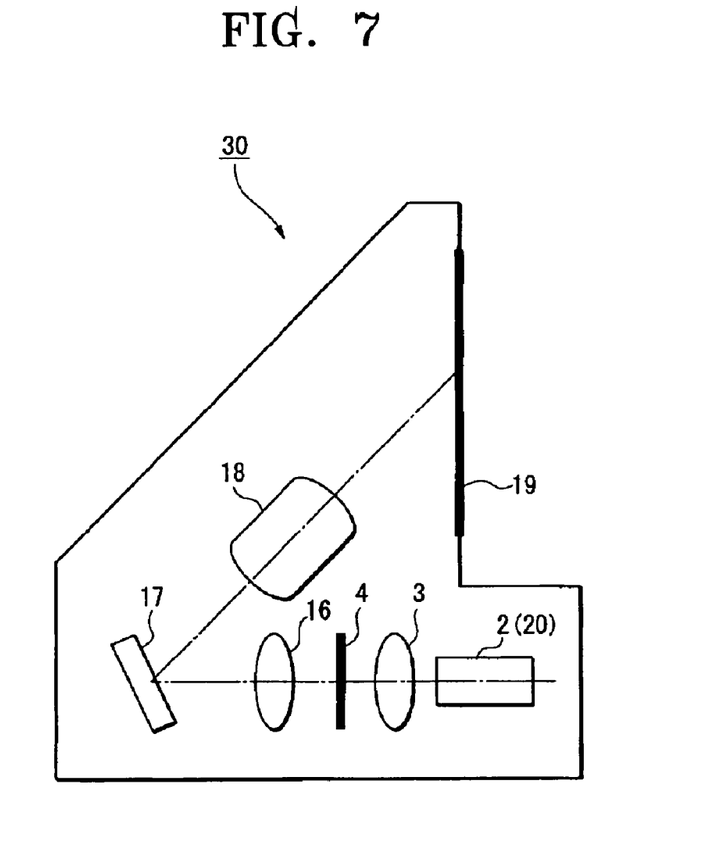
FIG. 7 illustrates a schematic construction of an image projection apparatus using an illumination optical system according to another exemplary embodiment of the present invention.

FIG. 7 illustrates a schematic construction of an image projection apparatus using an illumination optical system according to another exemplary embodiment of the present invention.

As illustrated in FIG. 7, the schematic construction of a rear projection television 30 according to an exemplary embodiment is comprised of an illumination unit 2, a condensing lens 3, a space modulation element 4, a condensing lens 16, a mirror 17, a projection lens 18, and a transmission type screen 19. Hereinafter, differences between FIGS. 1 and 7 are described.

The condensing lens 16 and the projection lens 18 are a projection optical system that enlarges and projects a space-modulated image emitted from the space modulation element 4 onto the transmission type screen 19.

The mirror 17 is an optical deflection unit for folding an optical path of the projection optical system.

Although not shown, the transmission type screen 19 is formed by stacking a Fresnel lens sheet and a lenticular sheet including a diffusion layer. The transmission type screen 19 allows a diverging light projected by the projection lens 18 to be made as substantially parallel light that proceeds in a horizontal direction from the Fresnel lens sheet, and properly diffuses the light in horizontal and vertical directions when transmitting the lenticular lens sheet. Thus, an observer may observe an image caused by a transmitted light of the transmission type screen 19 in the range of a predetermined view angle.

According to the rear projection television 30, since the illumination unit 2 is used as a projection light source, the same effects as those of the illumination unit 2 illustrated in FIG. 1 may be obtained.

The illumination optical system illustrated in FIG. 1 may be properly employed as the illumination unit 2. For example, an illumination unit 20 instead of the illumination unit 2 may also be used.

Third Exemplary Embodiment

An image projection apparatus according to another exemplary embodiment of the present invention is described below.

Figure 8:
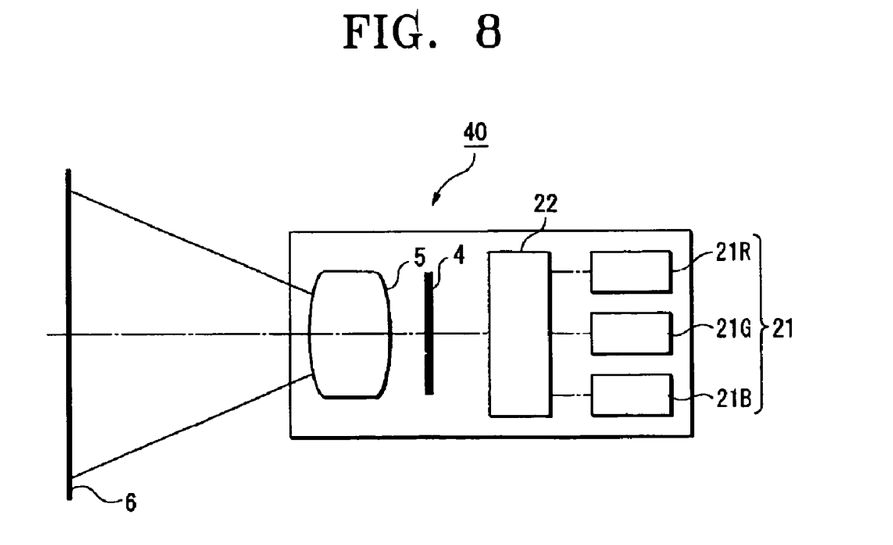
FIG. 8 illustrates a schematic construction of an image projection apparatus using an illumination optical system according to another exemplary embodiment of the present invention.

FIG. 8 illustrates a schematic construction of an image projection apparatus using an illumination optical system according to another exemplary embodiment of the present invention.

As illustrated in FIG. 8, a projector 40 according to an exemplary embodiment includes an illumination unit 21 and an optical path synthesizing unit 22 instead of the illumination unit 2 and the condensing lens 3 of the projector 1 illustrated in FIG. 1. Hereinafter, differences between FIGS. 1 and 8 are described.

The illumination unit 21 includes illumination optical systems 21R, 21G, and 21B that emit substantially parallel lights of red, green, and blue, respectively. Each illumination optical system replaces an LED 10 or 13 with monochrome LED elements having monochrome LED chips that generate wavelength lights of red, green, and blue in the illumination unit 2 or 20 illustrated in FIG. 1. Each monochrome LED may be a single LED chip or the arrangement of a plurality of LED chips.

The optical path synthesizing unit 22 synthesizes three-color lights emitted from the illumination unit 21 on the same optical path and condenses the three-color lights in a predetermined region on the space modulation element 4. For example, a combination of a dichroic prism or dichroic mirror and a proper condensing lens may be employed.

The projector 40 having the construction is an example of an image projection apparatus having a plurality of illumination optical systems illustrated in FIG. 1. Thus, an exemplary embodiment has the effects as those of FIG. 1.

Furthermore, in the above description, an LED is used as a light source and an optical system is not disposed between the LED and a reflection optical system. However, an optical element, such as a lens or a light guide unit having a condensing function, may be disposed between the LED and the reflection optical system to restrict the range of a light distribution angle incident on the reflection optical system. Additionally, even though a space between the LED and the reflection optical system is filled with a light transmission resin for spatial fixing of the LED and electrode arrangement, the same effects may also be obtained.

Additionally, the example in which the illumination optical systems 21R, 21G, and 21B constitute the illumination unit 21 has been described in FIG. 8. However, the illumination optical systems 21R, 21G, and 21B may be constituted as independent illumination units.

Additionally, the example in which a light source may be regarded as a surface light source with respect to the effective diameter of the reflection optical system or the condensing lens has been described in FIG. 8. However, the light source of exemplary embodiments of the present invention is not limited to the surface light source. Even when the light source may be regarded as a point light source, when the light is disposed to be deviated from the optical axis, optical efficiency may be improved.

Additionally, the example in which a concave mirror has a refractive power increasing from a central part to a circumferential part has been described. However, the exemplary embodiments of the present invention are not limited to this. When the refractive power of the concave mirror is not increased from the central part to the circumferential part, the balance of a relative refractive power may be set in a refractive power distribution in a lens optical system.

Additionally, the example in which substantially parallel light is emitted from the illumination optical system has been described. However, the relative arrangement of the illumination optical system may be changed so that a diverging light or a converging light may be emitted.

Additionally, as an example for using the illumination optical system of exemplary embodiments of the present invention, the case where the illumination optical system is used in an image projection apparatus has been described. However, any unit for irradiating an illumination light is not specially limited to an apparatus for projecting an image and may be used as a portion of a proper illumination apparatus or light transmission apparatus.

Regarding the corresponding relationship between terms used in respective exemplary embodiments and terms to be used in the claims, only different names will now be described.

The projector 1 or 40 and the rear projection television 30 is an exemplary embodiment of an image projection apparatus. The LED 10 or 13 is an exemplary embodiment of a light source. The condensing lens 12 or 14 is an exemplary embodiment of a lens optical system. The LED chips R, G, and B are an exemplary embodiment of light-emitting elements.

As described above, the illumination optical system, the illumination unit, and the image projection apparatus employing the same according to exemplary embodiments of the present invention have the following effects.

Firstly, a reflection optical system is used such that a diverging light from a light source may be effectively condensed.

Secondly, even when the light source cannot be regarded as a point light source, deviation in a direction of reflection an off-axis light with respect to an on-axis light generated in the reflection optical system may be reduced by the lens optical system such that light emitted from the lens optical system including the off-axis light may be effectively condensed and optical efficiency may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination optical system, comprising:
a light source for irradiating a diverging light;
a reflection optical system for condensing the diverging light from the light source; and
a lens optical system for projecting the light condensed by the reflection optical system,
wherein the reflection optical system is comprised of an aspherical concave mirror, and
the lens optical system comprises a condensing lens having a positive refractive power in a central part and a refractive power of the condensing lens being decreased toward a circumferential part,
wherein a first surface of the condensing lens is formed as a convex surface in the circumferential part and a second surface is formed as a concave surface in the circumferential part and having a shape substantially similar to the convex surface of the first surface.

2. The illumination optical system of claim 1, wherein the concave mirror of the reflection optical system comprises a rotationally symmetrical aspherical concave reflective surface.

3. The illumination optical system of claim 2, wherein the concave reflective surface of the concave mirror has a refractive power increasing from the central part to the circumferential part.

4. The illumination optical system of claim 1, wherein the concave mirror is disposed at a distance in which on-axis light reflected from the circumferential part of the concave mirror becomes substantially parallel light.

5. The illumination optical system of claim 1, wherein the condensing lens is a bilateral apsherical lens.

6. The illumination optical system of claim 5, wherein the condensing lens has
the first surface nearest the concave mirror formed as a concave surface in the central part; and
the second surface away from the concave mirror formed as a convex surface having a smaller curvature than the concave surface of the first surface in the central part.

7. The illumination optical system of claim 1, wherein the light source is not a point light source.

8. The illumination optical system of claim 1, wherein the light source is a surface light source having a finite size with respect to an effective diameter of the reflection optical system.

9. The illumination optical system of claim 1, wherein the light source is constituted by arranging a plurality of light-emitting elements.

10. The illumination optical system of claim 9, wherein the light-emitting elements are red (R), green (G), and blue (B) of monochrome light-emitting elements.

11. The illumination optical system of claim 10, wherein the monochrome light-emitting elements disposed on the circumferential part of a light-emitting surface of the light source are disposed so that the respective monochrome colors are circulated.

12. The illumination optical system of claim 10, wherein the monochrome light-emitting elements disposed on the central part of a light-emitting surface of the light source are disposed so that the respective monochrome colors are bilaterally symmetrical or rotationally symmetrical with one another.

13. An illumination unit having a plurality of illumination optical systems, wherein each illumination optical system comprises:

a light source for irradiating a diverging light;

a reflection optical system for condensing the diverging light from the light source; and a lens optical system for projecting the light condensed by the reflection optical system, wherein the reflection optical system is comprised of an aspherical concave mirror, and the lens optical system comprises a condensing lens having a positive refractive power in a central part and a refractive power of the condensing lens being decreased toward a circumferential part, wherein a first surface of the condensing lens is formed as a convex surface in the circumferential part and a second surface is formed as a concave surface in the circumferential part and having a shape substantially similar to the convex surface of the first surface.

14. The illumination unit of claim 13, wherein the concave mirror of the reflection optical system comprises a rotationally symmetrical aspherical concave reflective surface.

15. The illumination unit of claim 13, wherein the light source is a surface light source having a finite size with respect to an effective diameter of the reflection optical system.

16. An image projection apparatus in which an illumination optical system is employed as a projection light source, wherein the illumination optical system comprises:

a light source for irradiating a diverging light;

a reflection optical system for condensing the diverging light from the light source; and a lens optical system for projecting the light condensed by the reflection optical system, wherein the reflection optical system is comprised of an aspherical concave mirror, and the lens optical system comprises a condensing lens having a positive refractive power in a central part and a refractive power of the condensing lens being decreased toward a circumferential part and a first surface of the condensing lens is formed as a convex surface in the circumferential part and a second surface is formed as a concave surface in the circumferential part and having a shape substantially similar to the convex surface of the first surface.

17. The image projection apparatus of claim 16, wherein the concave mirror of the reflection optical system comprises a rotationally symmetrical aspherical concave reflective surface.

18. The image projection apparatus of claim 16, wherein the light source is a surface light source having a finite size with respect to an effective diameter of the reflection optical system.

19. An image projection apparatus in which an illumination unit having a plurality of illumination optical systems is employed as a projection light source, wherein each illumination optical system comprises:

a light source for irradiating a diverging light;

a reflection optical system for condensing the diverging light from the light source; and a lens optical system for projecting the light condensed by the reflection optical system, wherein the reflection optical system is comprised of an aspherical concave mirror, and the lens optical system comprises a condensing lens having a positive refractive power in a central part and a refractive power of the condensing lens being decreased toward a circumferential part and a first surface of the condensing lens is formed as a convex surface in the circumferential part and a second surface is formed as a concave surface in the circumferential part and having a shape substantially similar to the convex surface of the first surface.

20. The image projection apparatus of claim 19, wherein the concave mirror of the reflection optical system comprises a rotationally symmetrical aspherical concave reflective surface.

21. The image projection apparatus of claim 20, wherein the light source is a surface light source having a finite size with respect to an effective diameter of the reflection optical system.

* * * * *